（12) United States Patent
Hirano (10) Patent No.: US 6,283,888 B1
(45) Date of Patent: Sep. 4, 2001

(54) INFINITE SPEED RATIO TRANSMISSION DEVICE (75) Inventor: Hiroyuki Hirano, Kouza-gun (JP)

(73) Assignee: Nisan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/521,885

(22) Filed: Mar. 9, 2000

(30) Foreign Application Priority Data

Mar. 25, 1999 (JP) ................................. 11-081620

(51) Int. Cl.$^7$ ............................ F16H 37/02; F16H 57/02
(52) U.S. Cl. ..................... 475/216; 475/217; 74/606 R
(58) Field of Search ................................. 475/216, 217, 475/215; 74/606 R (56) References Cited

U.S. PATENT DOCUMENTS

| 4,872,371 | * | 10/1989 | Fellows | 475/216 |
| 5,902,208 | * | 5/1999 | Nakano | 74/606 R |
| 5,935,039 | * | 8/1999 | Sakai et al. | 476/10 |
| 5,976,049 | * | 11/1999 | Yashida et al. | 74/606 R |
| 6,171,210 | * | 1/2001 | Miyata et al. | 475/216 |

FOREIGN PATENT DOCUMENTS

| 2274315 | * | 7/1994 | (GB) | 475/216 |
| 63-219956 | | 9/1988 | (JP) . | |
| 9-317837 | | 12/1997 | (JP) . | |

* cited by examiner

Primary Examiner—Sherry Estremsky
Assistant Examiner—Ha Ho
(74) Attorney, Agent, or Firm—Foley & Lardner (57) ABSTRACT An infinite speed ratio transmission device comprises a continuously variable transmission which varies the rotation speed of an input shaft (1) at an arbitrary speed ratio, a fixed speed ratio transmission (3) which varies the rotation speed of the input shaft (1) at a fixed speed ratio, and a planetary gear set (5) which outputs the rotation to a final output shaft (6) according to the relative rotation of the continuously variable transmission (2) and fixed speed ratio transmission (3). The continuously variable transmission (2) comprises a first toroidal unit (2A) and a second toroidal unit (2B) respectively provided with an input disk (21) which rotates together with the input shaft (1), output disk (22) and two power rollers gripped between these disks, and a first sprocket (24) disposed between the output disks (22), which rotates together with the output disks (22). The rotation of the first sprocket (24) is transmitted to a sun gear (5A) of the planetary gear set (5) via a chain (40) and a second sprocket (4A). A casing (14) of the infinite speed ratio transmission device supports the first sprocket (24) such that the latter is free to rotate via an intermediate wall (60). A supporting surface (14D) of the casing (14) which supports the intermediate wall (60) forms an approximate right angle to the tension direction of the chain (40).

5 Claims, 14 Drawing Sheets

INFINITE SPEED RATIO TRANSMISSION DEVICE

FIELD OF THE INVENTION

This invention relates to the structure of an infinite speed ratio transmission device for vehicles using a toroidal continuously variable transmission.

BACKGROUND OF THE INVENTION

Tokkai Sho 63-219956 published by the Japanese Patent Office in 1988 discloses an infinite speed ratio transmission device for vehicles using a toroidal continuously variable transmission (CVT).

In this transmission device, a CVT having a speed ratio which can be continuously varied, and a fixed speed ratio transmission, are connected in parallel to an input shaft joined to an engine, the rotation of the output shafts of the transmissions are input to a planetary gear set, and the final output rotation from the planetary gear set is extracted as a drive torque of the vehicle.

The rotation output of the CVT is input to a sun gear of the planetary gear set via a chain and a sprocket, and the output shaft of the fixed speed ratio transmission is joined to a planet carrier of the planetary gear set via a power circulation mode clutch.

A ring gear of the planetary gear mechanism is joined to a final output shaft.

The rotation output of the CVT is also input to the final output shaft via a direct connection mode clutch.

In a power circulation mode wherein a power circulation mode clutch is engaged and a direct mode clutch is disengaged, a speed ratio of the infinite speed ratio transmission device, i.e., the ratio of the rotation speeds of the input shaft and final output shaft, can be continuously varied from a negative value to a positive value including infinity according to the difference of the speed ratio of the CVT and the speed ratio of the fixed speed ratio transmission.

In a direct mode wherein the power circulation mode clutch is disengaged and the direct mode clutch is engaged, the product of the speed ratio of the CVT and a speed ratio due to chain transmission is the speed ratio of the infinite speed ratio continuously variable transmission.

Tokkai Hei 9-317837 published by the Japanese Patent Office in 1997 discloses a CVT having two sets of toroidal units and an intermediate wall which is provided between the toroidal units and support output disks via bearings. The intermediate wall comprises a pair of partitions which are fixed to brackets projecting inwards from a casing of the CVT by bolts.

SUMMARY OF THE INVENTION

Tokkai Hei 9-317837 disposes the bolts in parallel with an input shaft of the CVT. If this CVT is applied to an infinite speed ratio transmission device, one possible arrangement is that an output sprocket is provided instead of the output gear between the partitions, and the rotation of the output sprocket is transmitted to the sun gear of the planetary gear set via a chain.

If this arrangement is applied, the tension of the chain exerts a force on the output sprocket which is perpendicular to the input shaft. This force is supported by the partitions via the bearings and, as a result, a shearing force acts on the bolts which fix the partitions to the casing.

This means that the size and number of bolts must be increased according to the tension of the chain.

Considering the assembling process of the transmission device, the final output shaft on which a sprocket with the chain looped around, is first inserted into the casing. One of the partitions and the output sprocket is then put into the casing, and after looping the chain around the output sprocket, the other partition is put into the casing and the partitions are fixed together to the casing by means of the bolts. The assembling of the partitions and the fixing thereof to the casing are performed from an opening corresponding to an axial end of the casing. Before securing the bolts, the partitions must be positioned so that the bolt holes of the partitions and those of the bracket of the casing coincide with each other. However, since the partitions are situated effectively in the middle of the casing, it is difficult to precisely position the partitions from the opening at the axial end of the casing. Screwing of the bolts into the bolt holes is also performed from this opening. In order to perform this operation, it is necessary to insert a tool into a narrow space in casing from the opening.

However, if the opening of the casing is enlarged in order to facilitate the positioning of partitions and tightening of the bolts, the rigidity of the whole casing declines and it is difficult to reserve space for installing auxiliary devices, such as an oil pump, which are fitted to the outside of the casing.

It is therefore an object of this invention to support the tension of a chain without depending on the shearing resistance of bolts.

It is another object of this invention to facilitate the fixing of partitions to the casing.

It is yet another object of this invention to facilitate the assembly of an infinite speed ratio transmission device, without reducing the rigidity of the casing.

In order to achieve the above objects, this invention provides an infinite speed ratio transmission device for a vehicle, comprising an input shaft, a first toroidal unit, a second toroidal unit, a first sprocket, a fixed speed ratio transmission, a planetary gear set, a chain, a casing and an intermediate wall.

The first toroidal unit includes a first input disk which rotates together with the input shaft, a first output disk, and two power rollers gripped between the first input disk and the first output disk. The second toroidal unit includes a second input disk which rotates together with the input shaft, a second output disk, and two power rollers gripped between the second input disk and the second output disk, the first and second output disks being disposed coaxially adjacent to each other. The first sprocket is disposed between the first and second output disks, and rotates together with the first and second output disks.

The fixed speed ratio transmission varies the rotation speed of the input shaft at a fixed speed ratio.

The planetary gear set comprises a sun gear joined to a second sprocket, a planet carrier which inputs the output rotation of the fixed speed ratio transmission, and a ring gear which rotates according to the relative rotation of the sun gear and the planet carrier.

The chain connects the first sprocket and the second sprocket.

The casing houses the first toroidal unit, the second toroidal unit and the planetary gear set. The intermediate wall is fixed to the casing and supports the first sprocket free to rotate.

The casing comprises a supporting surface which supports the intermediate wall and forms an approximate right angle to an action direction of a tension of the chain.

The details as well as other features and advantages of this invention are set forth in the remainder of the specification and are shown in the accompanying drawings.

The details as well as other features and advantages of this invention are set forth in the remainder of the specification and are shown in the accompanying drawings.

DESCRIPTION OF THE PREFERRED EMBODIMENTS

Figure 1:
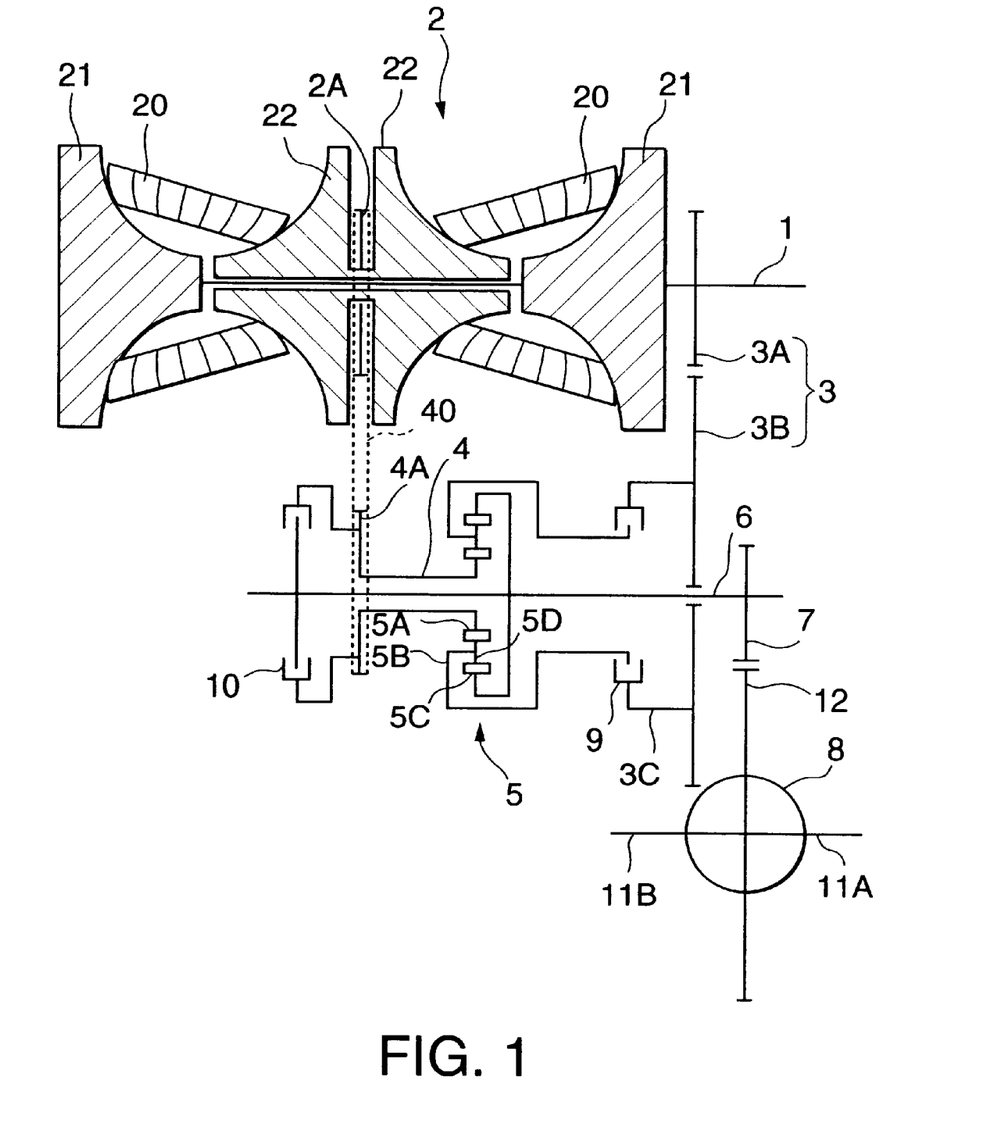
FIG. 1 is a schematic diagram of an infinite speed ratio transmission device according to this invention.

Referring to FIG. 1 of the drawings, an infinite speed ratio transmission device according to this invention comprises an input shaft 1, toroidal continuously variable transmission (hereafter referred to as CVT) 2, fixed speed ratio transmission 3, planetary gear set 5 and final output shaft 6.

The CVT 2 is equipped with a first toroidal unit 2A and second toroidal unit 2B, these units each being of the half toroidal type.

Each of the toroidal units 2A, 2B is equipped with an input disk 21 and an output disk 22, and a pair of power rollers 20 are gripped by the input disk 21 and output disk 22. The input disks 21 rotate together with the input shaft 1. The input shaft 1 is joined to an output shaft of an engine, not shown.

The output disk 22 of the first toroidal unit 2A is joined to the output disk 22 of the second toroidal unit 2B, and these disks rotate together with first sprocket 24 arranged between the output disks 22.

The rotation of the first sprocket 24 is transmitted to the CVT output shaft 4 via a chain 40 and a second sprocket 4A.

The CVT output shaft 4 is joined to a sun gear 5A of the planetary gear set 5, and also joined to the final output shaft 6 via a direct mode clutch 10.

A fixed speed ratio transmission 3 is equipped with an input gear 3A which rotates together with the input shaft 1, output gear 3B, and gear output shaft 3C. The input gear 3A is meshed with the output gear 3B, and the output gear 3B is joined to the gear output shaft 3C. The gear output shaft 3C is joined to a planet carrier 5B holding planet gears 5D of the planetary gear set 5 via a power circulation mode clutch 9. A ring gear 5C of the planetary gear set 5 is joined to the final output shaft 6.

The rotation of the final output shaft 6 is transmitted to drive wheel shafts 11A, 11B of the vehicle through a device output gear 7, final gear 12 and a differential 8.

In this infinite speed ratio transmission device, the drive wheel shafts 11A, 11B are driven in two kinds of power transfer modes, i.e., a power circulation mode wherein the power circulation clutch 9 is engaged and the direct clutch 10 is disengaged, or a direct mode wherein the power circulation clutch 9 is disengaged and the direct clutch 10 is engaged.

In the power circulation mode, the rotation speed of the final output shaft 6 can be continuously varied from a negative value to a positive value according to the difference of the speed ratio of the CVT2 and the fixed speed ratio transmission 3.

Figure 2:
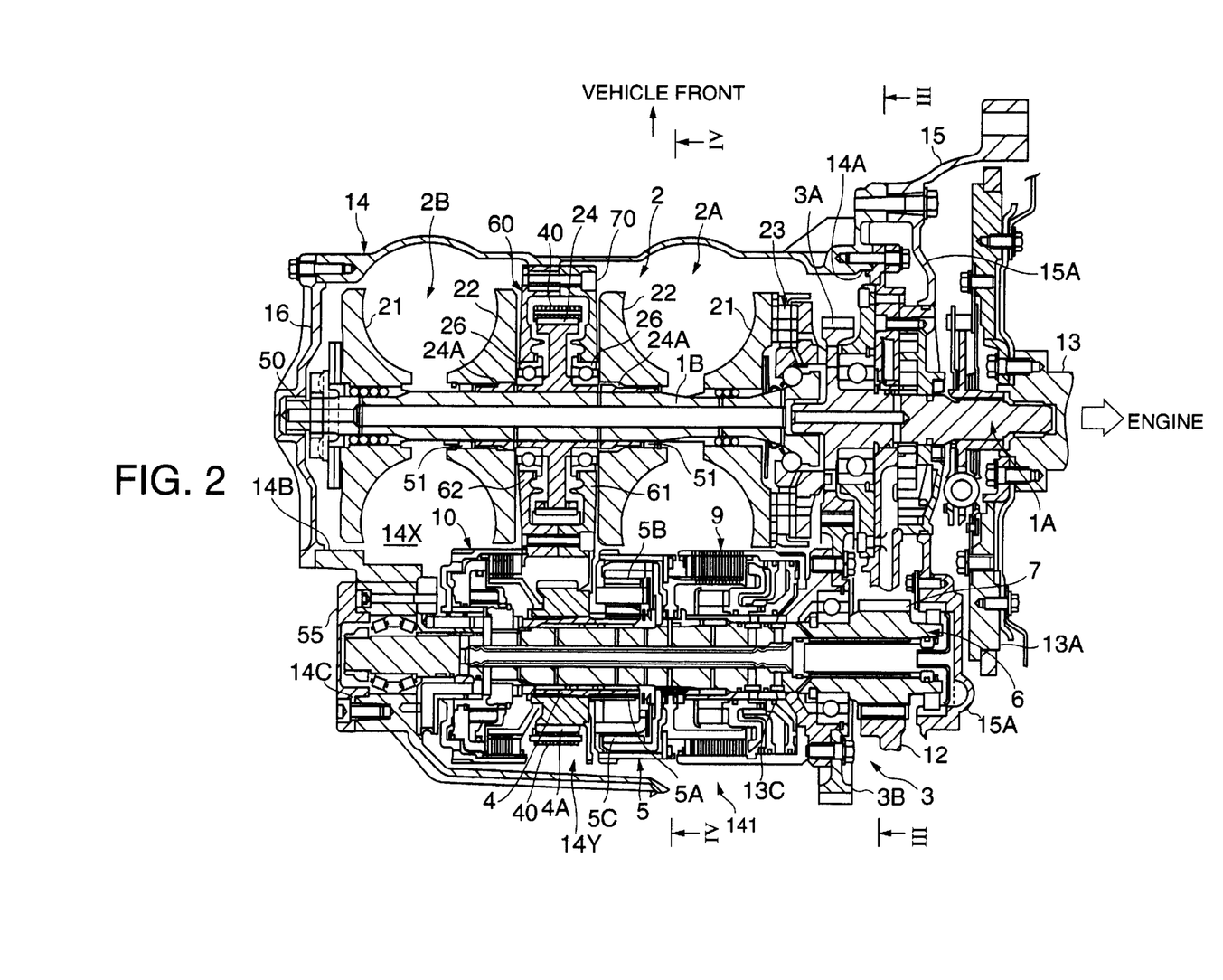
FIG. 2 is a longitudinal cross-sectional view of the infinite speed ratio transmission device.

Referring to FIG. 2, the input shaft 1 comprises shafts 1A, 1B which rotate together via loading cams 23 and which are disposed coaxially. The shaft 1A is joined to a crankshaft 13 of the engine. A flywheel 13A is attached to the crankshaft 13. The input gear 3A of the fixed speed ratio transmission 3 is fixed to the shaft 1A.

This infinite speed ratio continuously variable transmission is arranged in the engine room of the vehicle so that the shaft 1 is perpendicular to the direction of advance of the vehicle. In the figure, the upper part corresponds to the front of the vehicle. However, in the following description, in order to clarify the arrangement of components, the right-hand side of FIG. 2, i.e., the engine side, is referred to as the front part of the transmission device, and the left-hand side is referred to as the rear of the transmission device.

The shaft 1B is joined to the pair of input disks 21. The thrust force generated by the loading cams 23 due to the rotation of the shaft 1A causes the shafts 1A, 1B to rotate together via the input disk 21. Also, in the first toroidal unit 2A and second toroidal unit 2B, the input disk 21 is pressed against the output disk 22 by this thrust force.

Due to this thrust force, the power roller 20 gripped between the input disk 21 and output disk 22 transmits torque from one disk to the other disk.

The inside of a casing 14 of the infinite speed ratio transmission device comprises a space 14X which houses the CVT 2 and the input gear 3A of the fixed speed ratio transmission 3, and a space 14Y which houses the planetary gear mechanism 5, the final output shaft 6 and the output gear 3B of the fixed speed ratio transmission 3. These spaces 14X and 14Y are interconnected.

One end of the space 14X reaches a front end 14A on the right-hand side of the casing 14 in FIG. 2, and the other end reaches a rear end 14B on the left-hand side of the casing 14 in the figure. In a fully assembled infinite speed ratio continuously variable transmission, the front end 14A is closed by a wall 15A, and the rear end 14B is closed by a side cover 16. The wall 15A forms part of a front casing 15 which joins the casing 14 to the engine. A rear end 14C on the left-hand side of the space 14Y in the figure is closed by a side cover 55.

Figure 3:
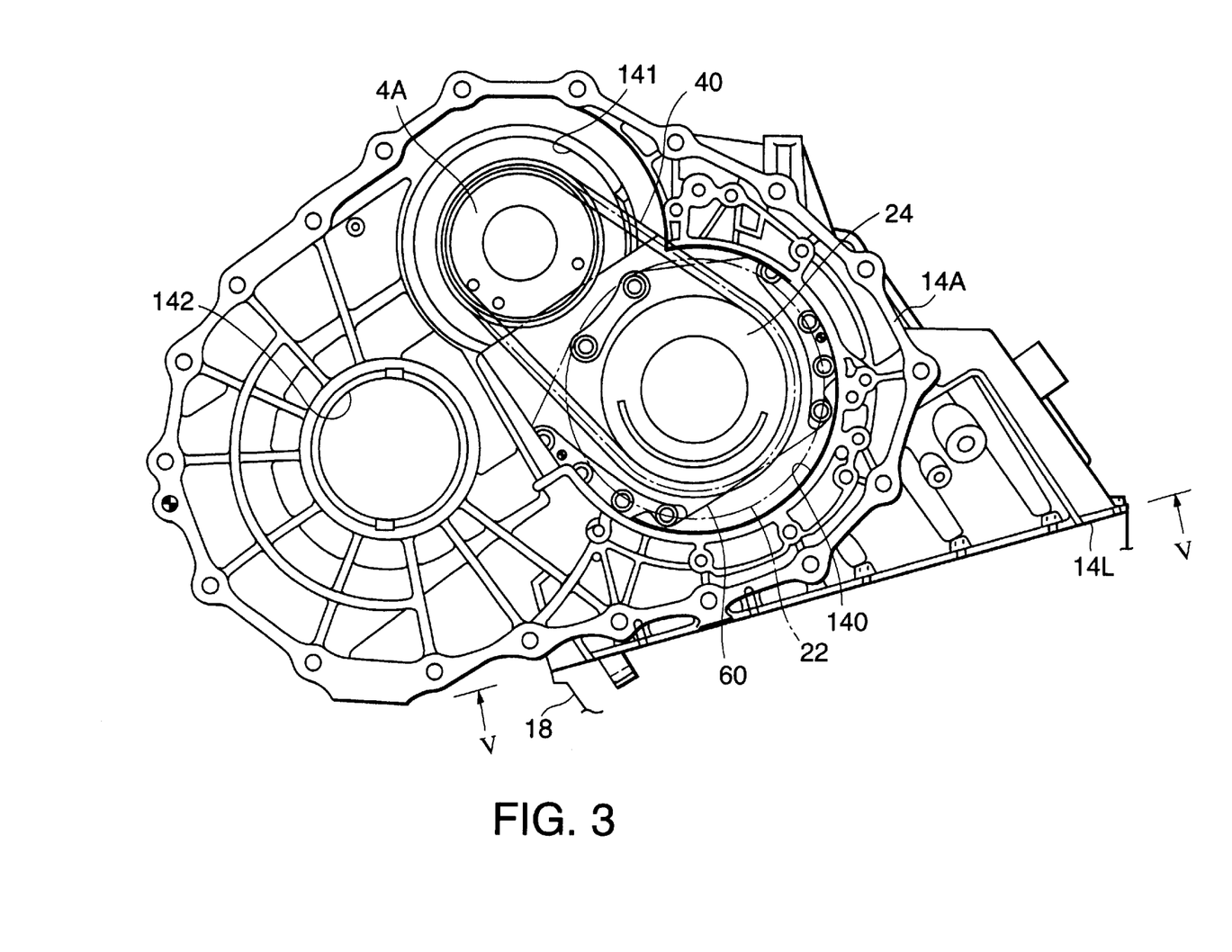
FIG. 3 is a transverse cross-sectional view of the infinite speed ratio transmission device taken along a line III—III in FIG. 2.

If the casing 14 is viewed from the right-hand side of FIG. 2 with the wall 15A removed, as shown in FIG. 3, the front end 14A of the casing 14 comprises an opening 140 for positioning the input shaft 1 and CVT 2 in the space 14X during assembly of the infinite speed ratio continuously variable transmission, an opening 141 for positioning the final output shaft 6, planetary gear mechanism 5, power circulation mode clutch 9, direct mode clutch 10, CVT output shaft 4 and second sprocket 4A in the space 14Y, and an opening 142 for positioning the drive wheel shafts 11A, 11B.

Referring again to FIG. 2, an intermediate wall 60 which projects in the space 14X toward the center between the two output disks 22, is formed on the inner circumference in the central part of the casing 14. The intermediate wall 60 comprises a front annular partition 61 and a rear annular partition 62 tightened by plural bolts 70, the first sprocket 24 being housed between these walls.

The shaft 1B is supported by a bearing 50 provided in the side cover 16.

The inner circumferences of the output disks 22 are in contact with the shaft 1B via needle bearings 51. As the output disks 22 are supported by the intermediate wall 60 through the bearings 26 and first sprocket 24, the input shaft 1B is also supported in a radial direction by the intermediate wall 60.

Figure 5:
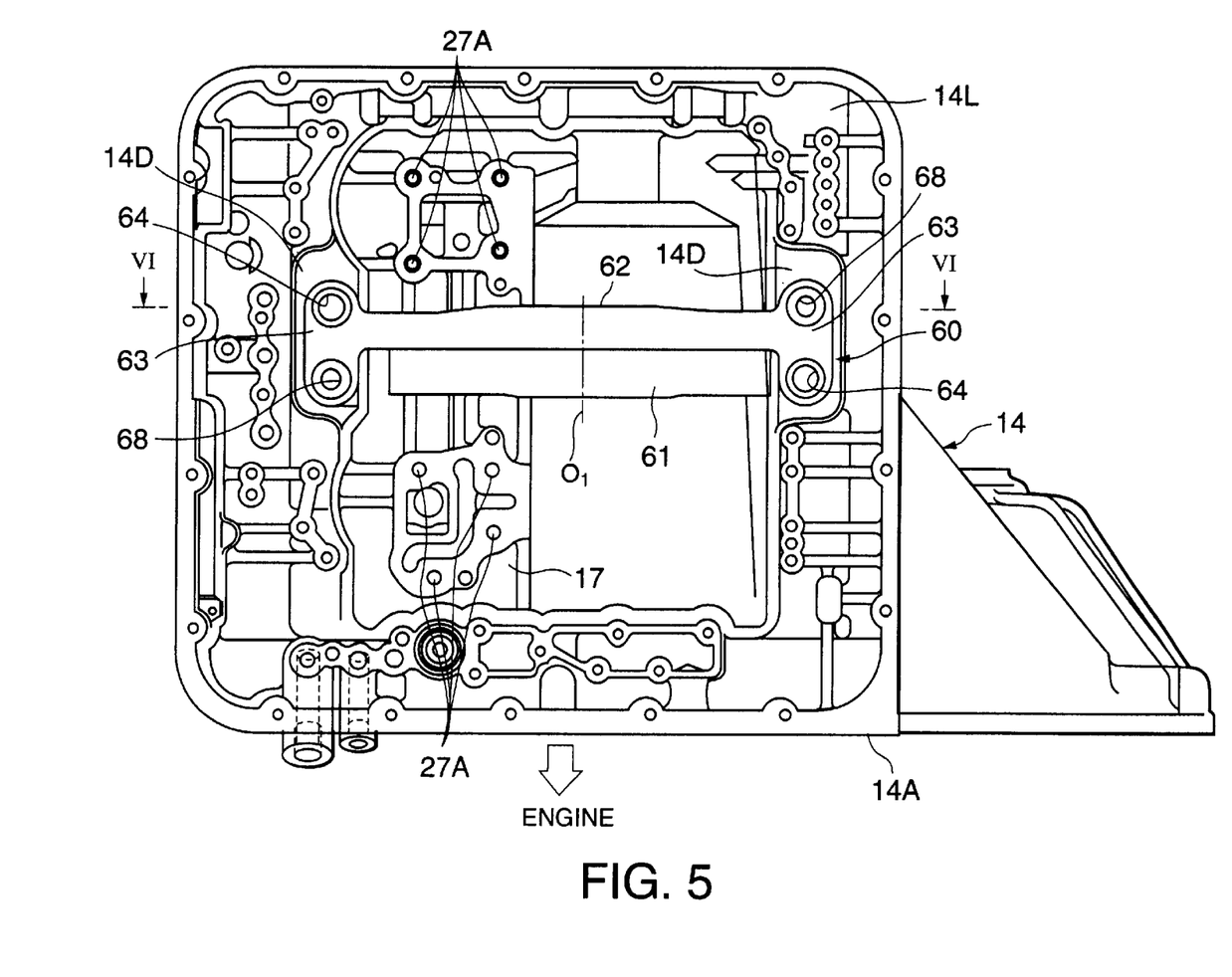
FIG. 5 is a horizontal cross-sectional view of the infinite speed ratio transmission device taken along a line V—V in FIG. 3.
Figure 6:
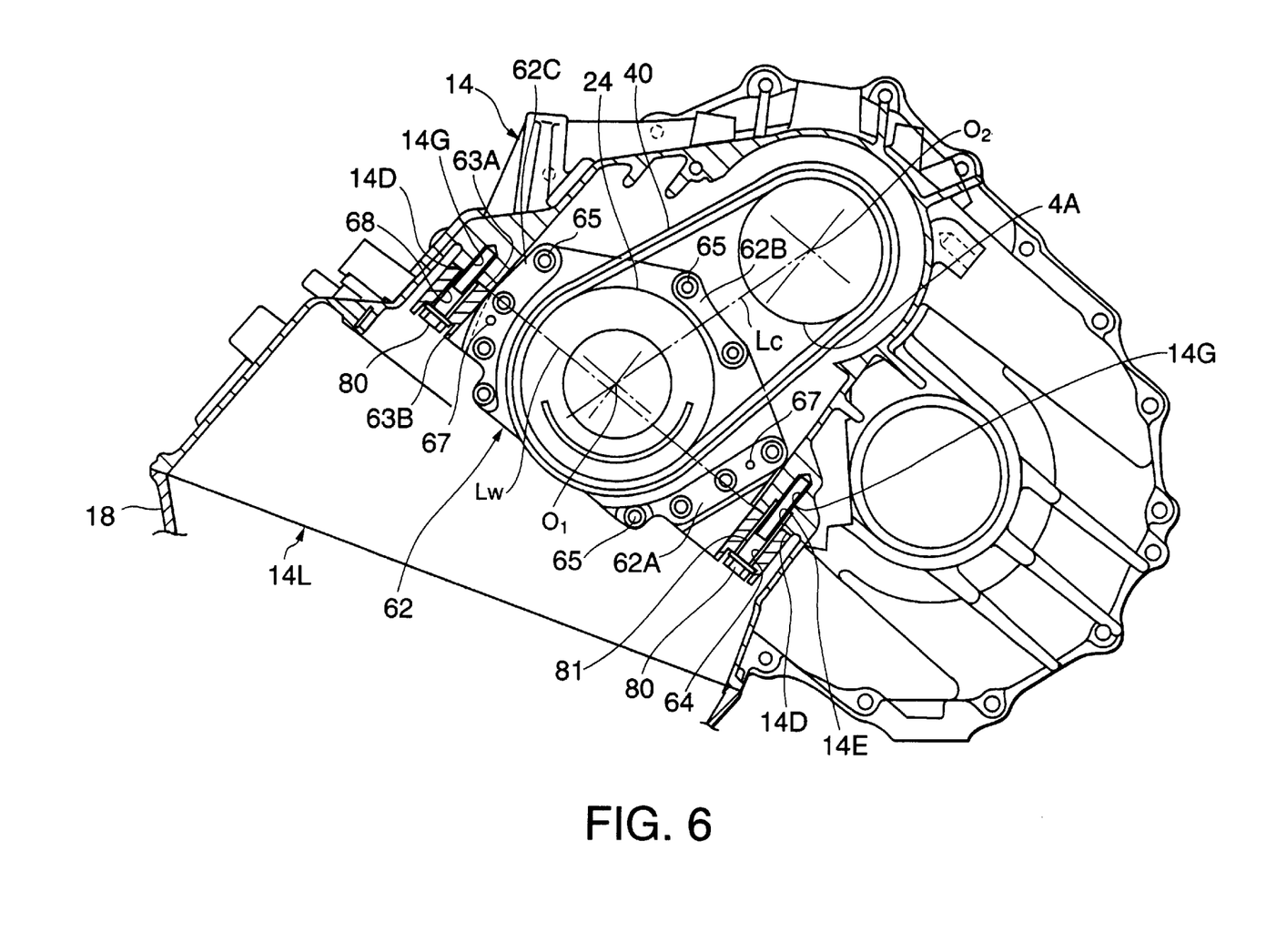
FIG. 6 is a transverse cross-sectional view of the infinite speed ratio transmission device taken along a line VI—VI line in FIG. 5.

Referring to FIGS. 5 and 6, an opening 14L for attaching an oil pan 18 is also formed in the casing 14. The opening 14L faces a side face of the shaft 1B.

Figure 14:
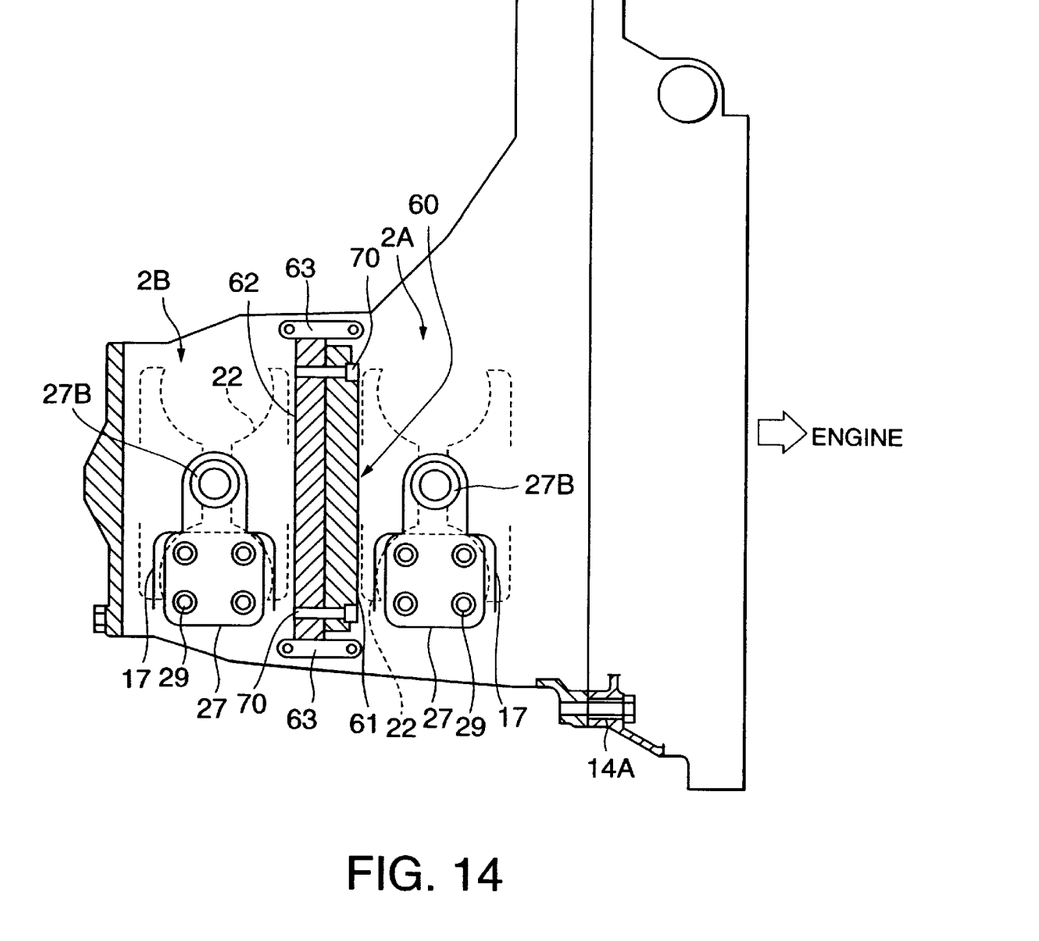
FIG. 14 is a schematic horizontal cross-sectional view of the infinite speed ratio transmission device describing the position of the intermediate wall and supports according to this invention.

The intermediate wall 60 is fixed to a predetermined position on the casing 14 by first fixing the rear partition 62 to the casing 14 by bolts 80 from the opening 14L, and then fixing the front partition 61 to the rear partition 62 by plural bolts 70 shown in FIGS. 2 and 14.

Referring again to FIG. 2, the first sprocket 24 comprises a cylindrical part 24A which projects to penetrate into the output disks 22 on both sides. The cylindrical part 24A is fitted on the outer circumference of the shaft 1B so as to be free to rotate relative to the shaft 1B, and the outer circumference of each of the tips of the cylindrical part 24A is spline jointed to the inner circumference of the output disk 22. The outer circumference of the base ends of the cylindrical part 24A are supported free to rotate by the front partition 61 and rear partition 62 via a pair of bearings 26.

Figure 4:
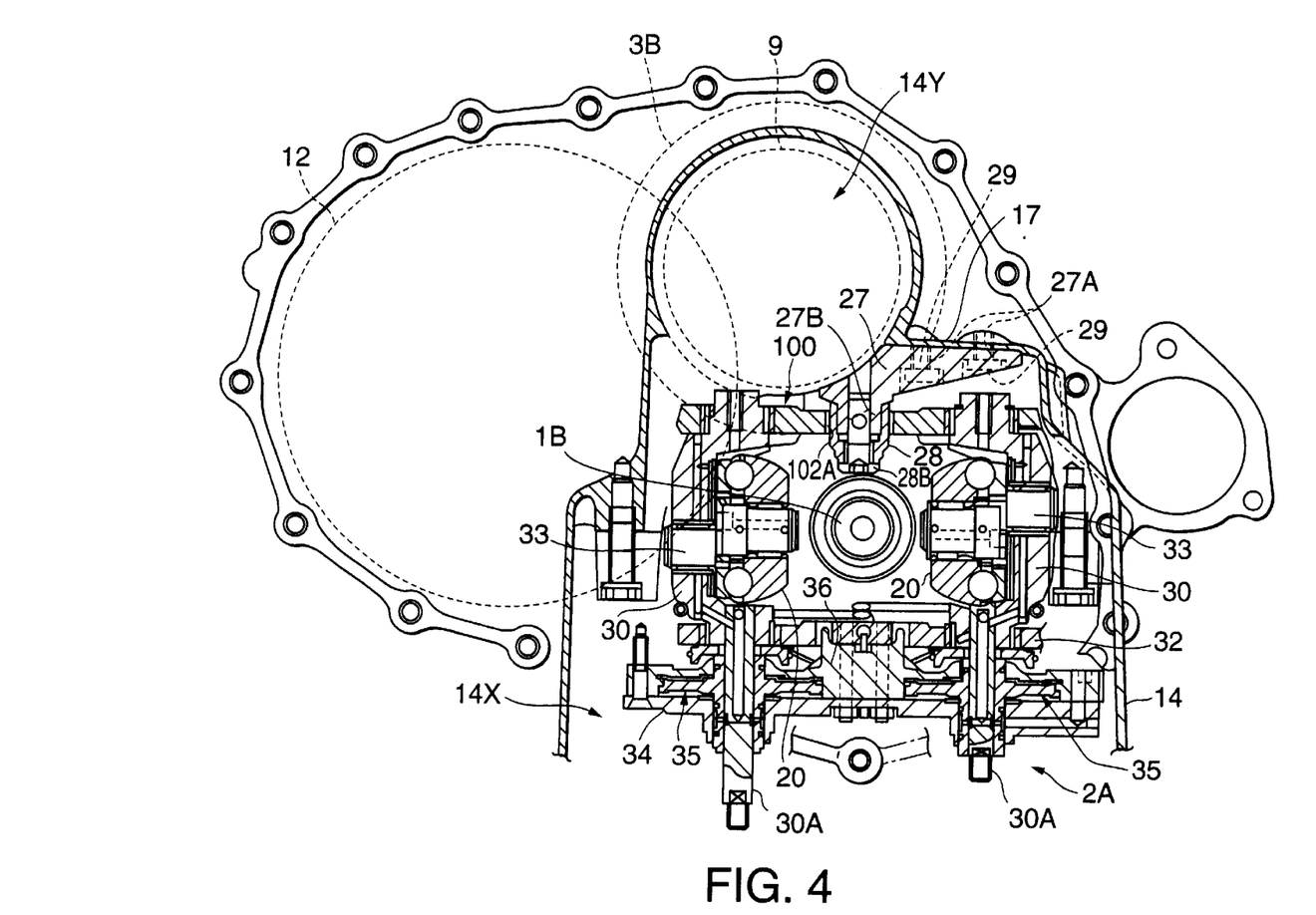
FIG. 4 is a transverse cross-sectional view of the infinite speed ratio transmission device taken along a line IV—IV in FIG. 2.

Next, referring to FIG. 4, the first and second toroidal units 2A, 2B forming the CVT 2 are housed in the space 14X. In the units 2A, 2B, the pair of power rollers 20 are supported by trunnions 30 via a pivot shaft 33, respectively. The lower end of the casing 14 shown in FIG. 4 reaches the opening 14L shown in FIG. 3.

Rods 30A are fixed to the lower ends of the trunnions 30. A hydraulic piston 35 is attached to each of the rods 30, and the rod 30A causes the trunnion 30 to displace in an axial direction according to a hydraulic pressure exerted on the hydraulic piston 35.

The upper ends of the trunnions 30 are connected to an upper link 100 via spherical joints. The center part of the upper link 100 is supported free to oscillate in the casing 14 via a support 27. The rods 30A are joined to a lower link 32. The center part of the lower link 32 is supported free to oscillate via a pin on a support 36 fixed to a body 34 which forms oil chambers for exerting hydraulic pressure on the hydraulic pistons 35.

The body 34 is fixed to the casing 14.

Due to the aforesaid construction, the trunnions 30 are supported in a state where they can displace in both an axial direction and around the shaft.

The two trunnions 30 of the first toroidal unit 2A also displace in mutually opposite axial directions, while maintaining the distance between the rods 30A approximately constant, according to the hydraulic pressure exerted on the hydraulic pistons 35. Likewise, the two trunnions 30 of the second toroidal unit 2B also displace in mutually opposite axial directions while maintaining the distance between the rods 30A approximately constant.

The joint structure of the upper link 100 and support 27 will now be described in detail. A downward projection 27B is formed on the support 27, and an upper link post 28 is fixed to the outer circumference of this projection 27B by a bolt 28B. A through hole 102A is formed in the center part of the upper link 100, the upper link 100 being joined to the upper link post 28 by a pin in the horizontal direction in a state where the upper link post 28 penetrates the through hole 102A.

Bolt holes 27A are formed in the support 27 which is fixed to a ceiling 17 of the casing 14 by bolts 29 passing through the bolt holes 27A, as shown in FIGS. 4 and 5.

The downward projection 27B projects near the boundary of the two spaces 14X and 14Y.

Figure 7:
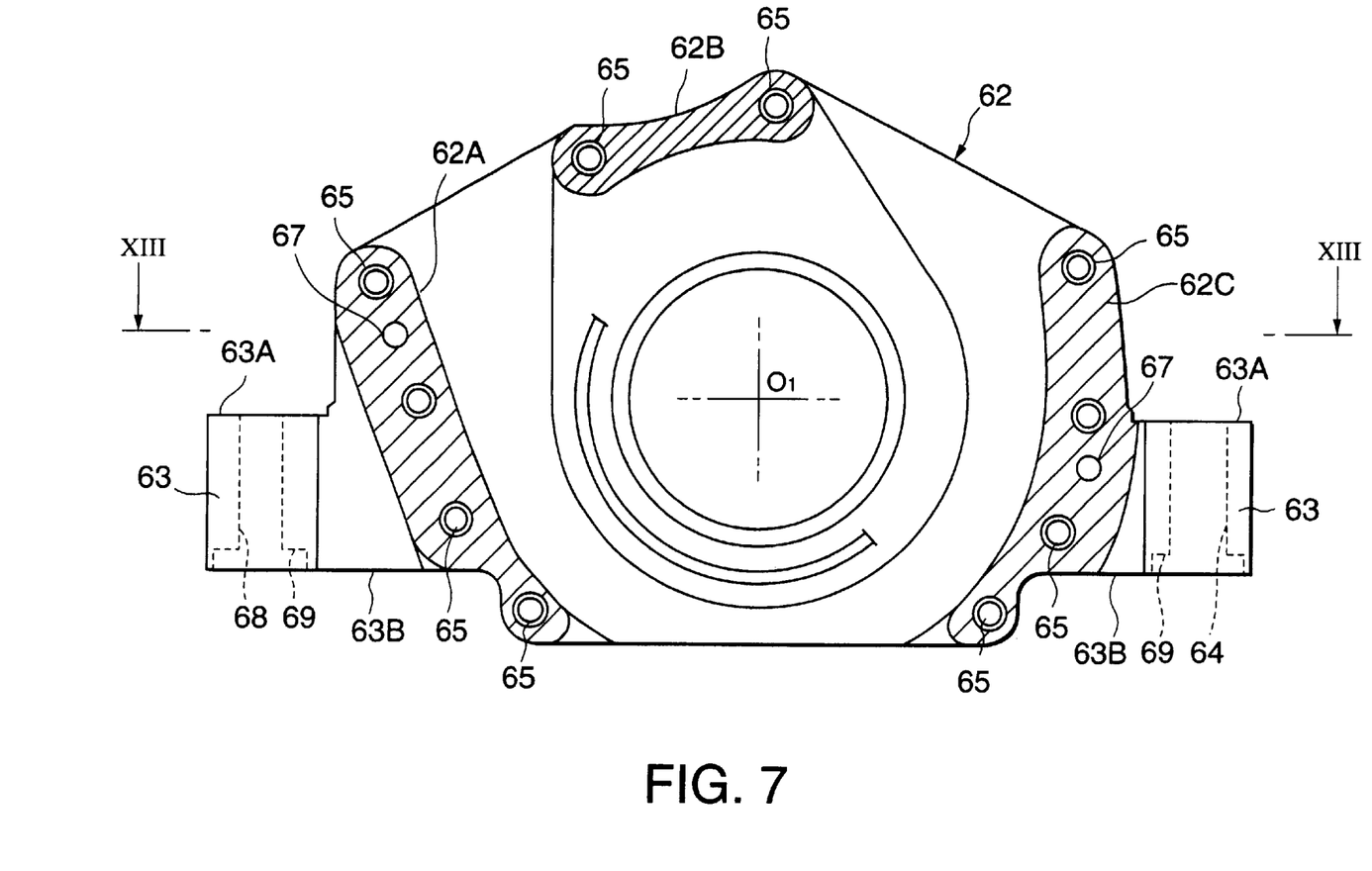
FIG. 7 is a front view of a rear partition according to this invention.
Figure 8:
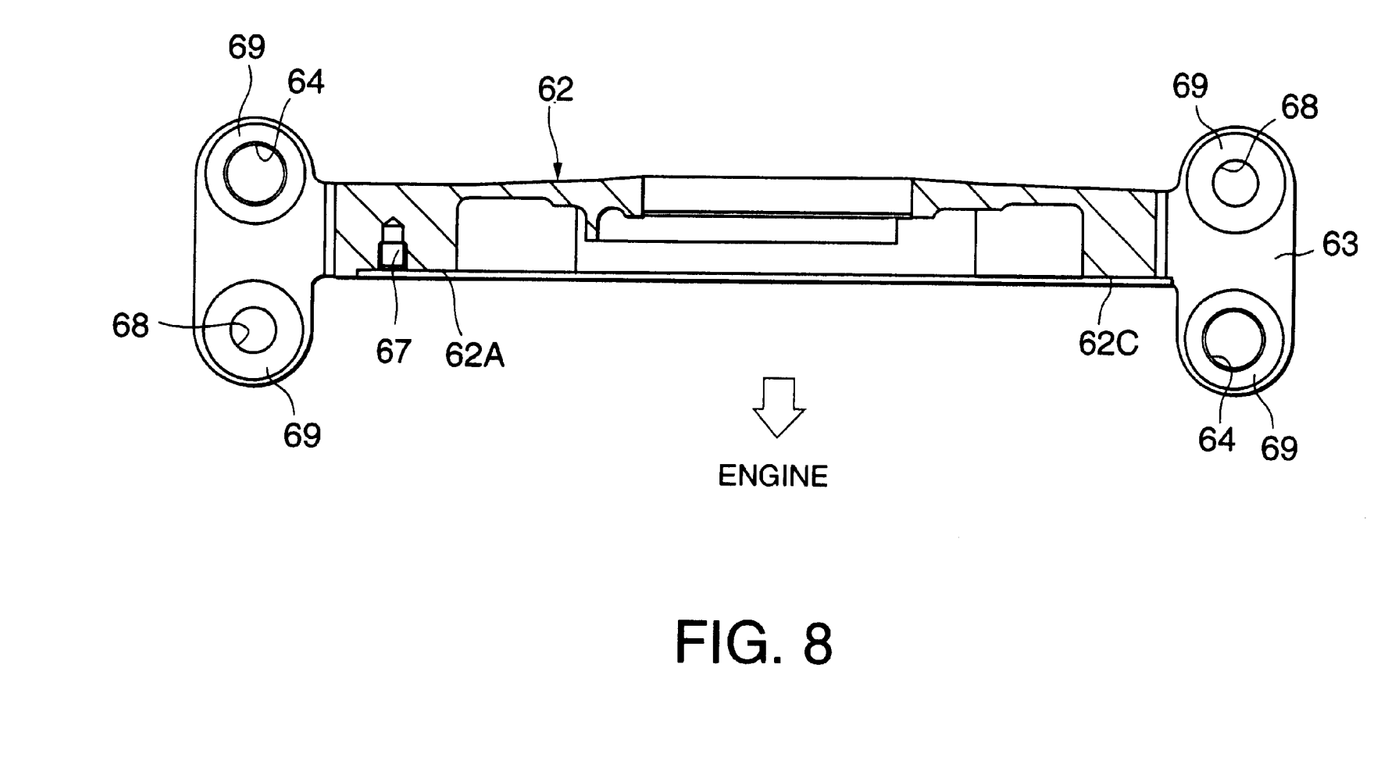
FIG. 8 is a horizontal sectional view of the rear partition taken along a line VIII—VIII in FIG. 7.

Next, referring to FIGS. 7 and 8, a pair of projections 63 are formed on both sides of the rear partition 62 in the directions perpendicular to a center line $O_1$ of the shaft 1B.

Contact parts 62A, 62C which project toward the front partition 61 are provided on the inside of the projections 63. Further, a contact part 62B which projects toward the front partition 61 is formed in proximity to the second sprocket 4A and at a position corresponding to the inside of the chain 40 on the rear partition 62.

Positioning holes 64 and through holes 68 are respectively formed in the projections 63. The positioning holes 64 of the projections 63 on the left and right are situated on a diagonal, and the through holes 68 are also situated on a diagonal as shown in FIG. 8.

The diameter of the positioning hole 64 is set to be larger than the diameter of the through hole 68.

Plural screw holes 65 for screwing in the bolts 70 shown in FIG. 2 are formed in the end faces of the contact parts 62A, 62B, 62C. Further, pinholes 67 for positioning the front partition 61 when the front partition 61 is joined, are respectively formed at predetermined positions in the contact parts 62A and 62C.

Referring to FIG. 6, an upper surface 63A of the projection 63 comes in contact with a supporting surface 14D of the casing 14. On the other hand, a lower surface 63B of the projection 63 faces the oil pan 18. Referring to FIG. 7, recesses 69 which house the heads of the bolts 80 are formed in the openings of the positioning holes 64 and the through holes 68 of the lower surface 63B.

Figure 9:
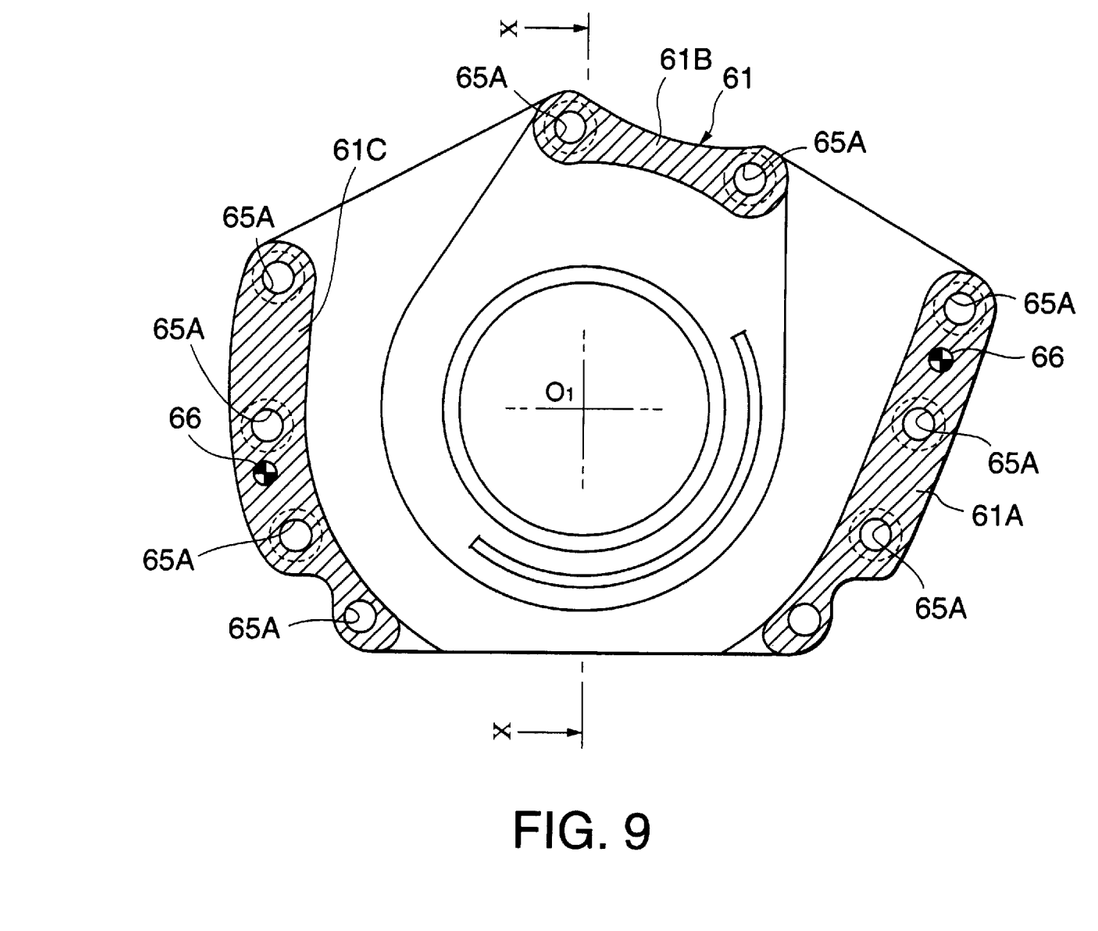
FIG. 9 is a rear view of a front partition according to this invention.
Figure 10:
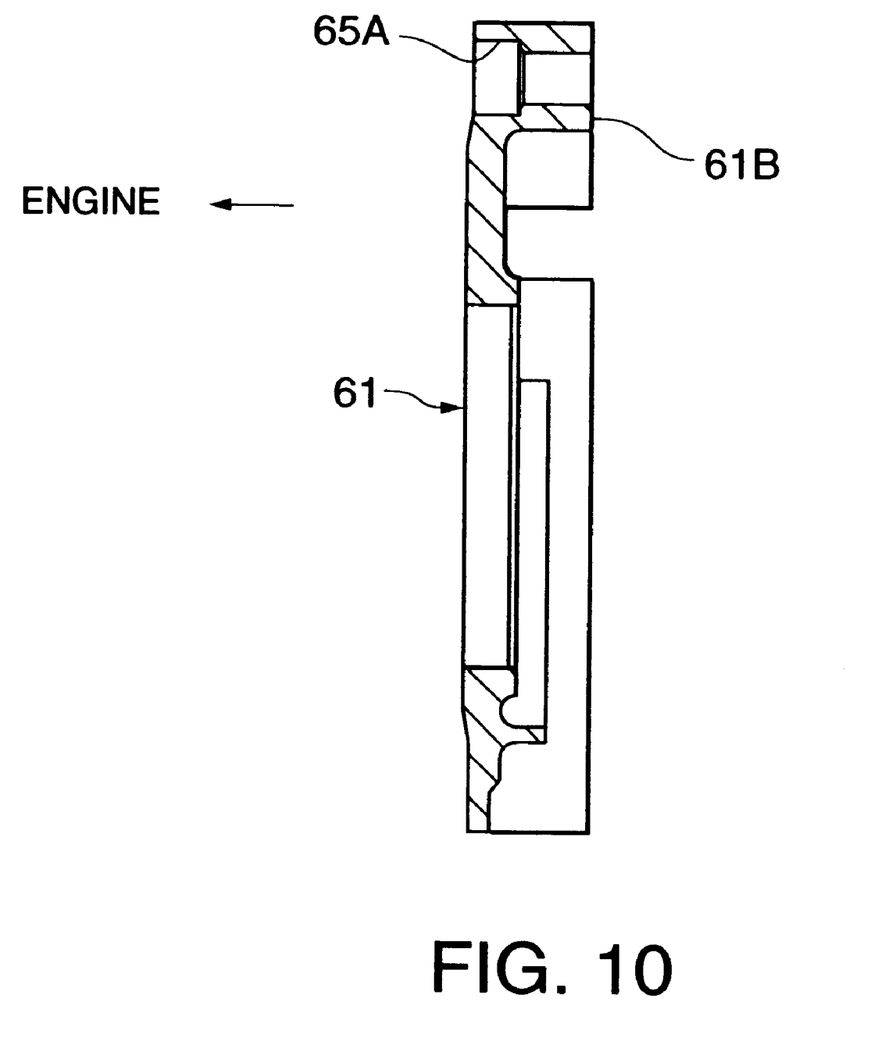
FIG. 10 is a longitudinal cross-sectional view of the front partition taken along a line X—X in FIG. 9.

Referring to FIGS. 9 and 10, contact parts 61A, 61B, 61C which project toward the contact parts 62A, 62B, 62C of the rear partition 62 are formed in the front partition 61. Through holes 65A into which bolts 70 are inserted, are formed in positions corresponding to the screw holes 65 of the rear partition 62 in the contact parts 61A, 61B, 61C. Knock pins 66 are also implanted in positions corresponding to the pinholes 67 of the rear partition 62.

Figure 11:
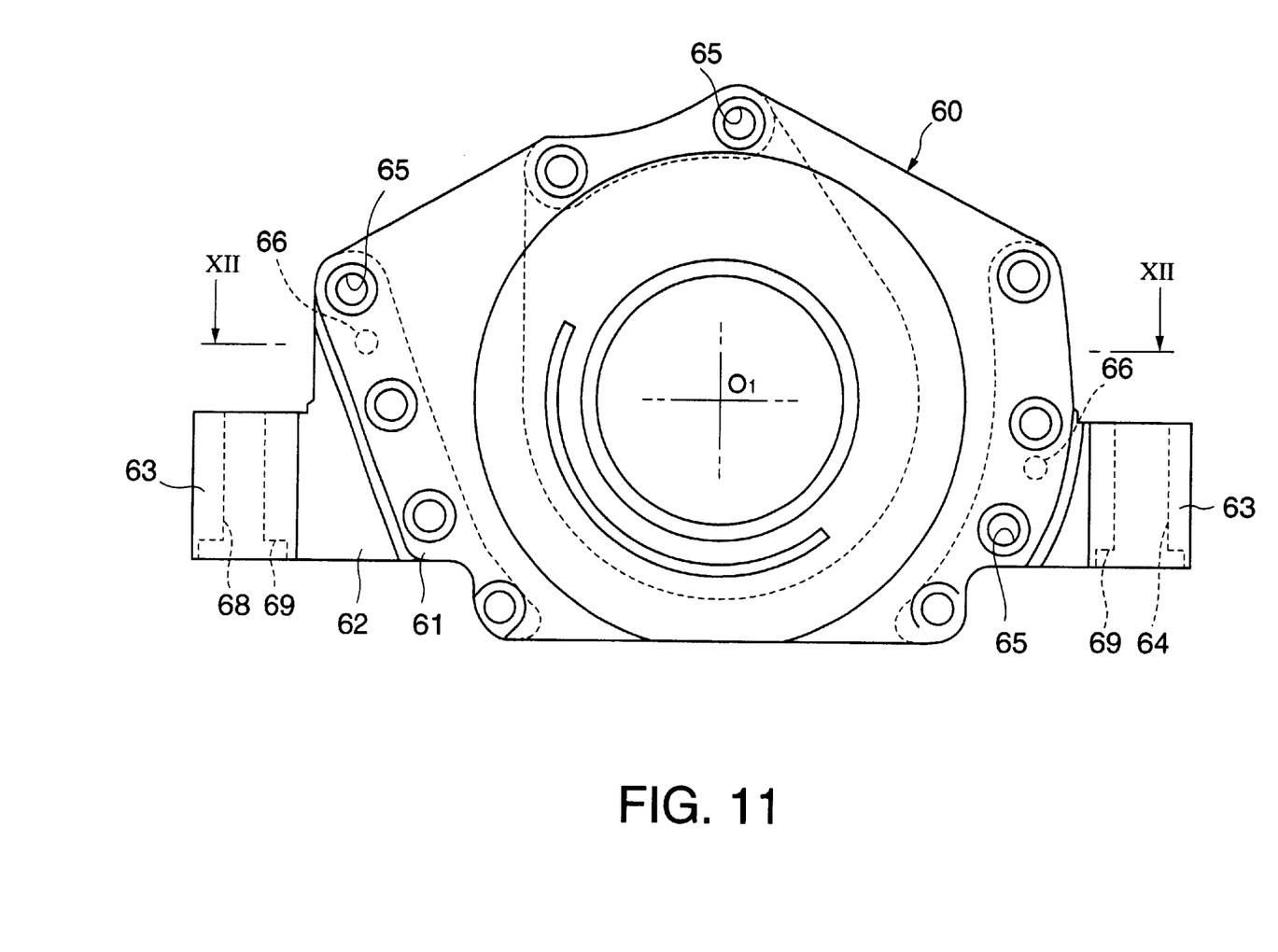
FIG. 11 is a front view of an intermediate wall according to this invention after assembly.
Figure 12:
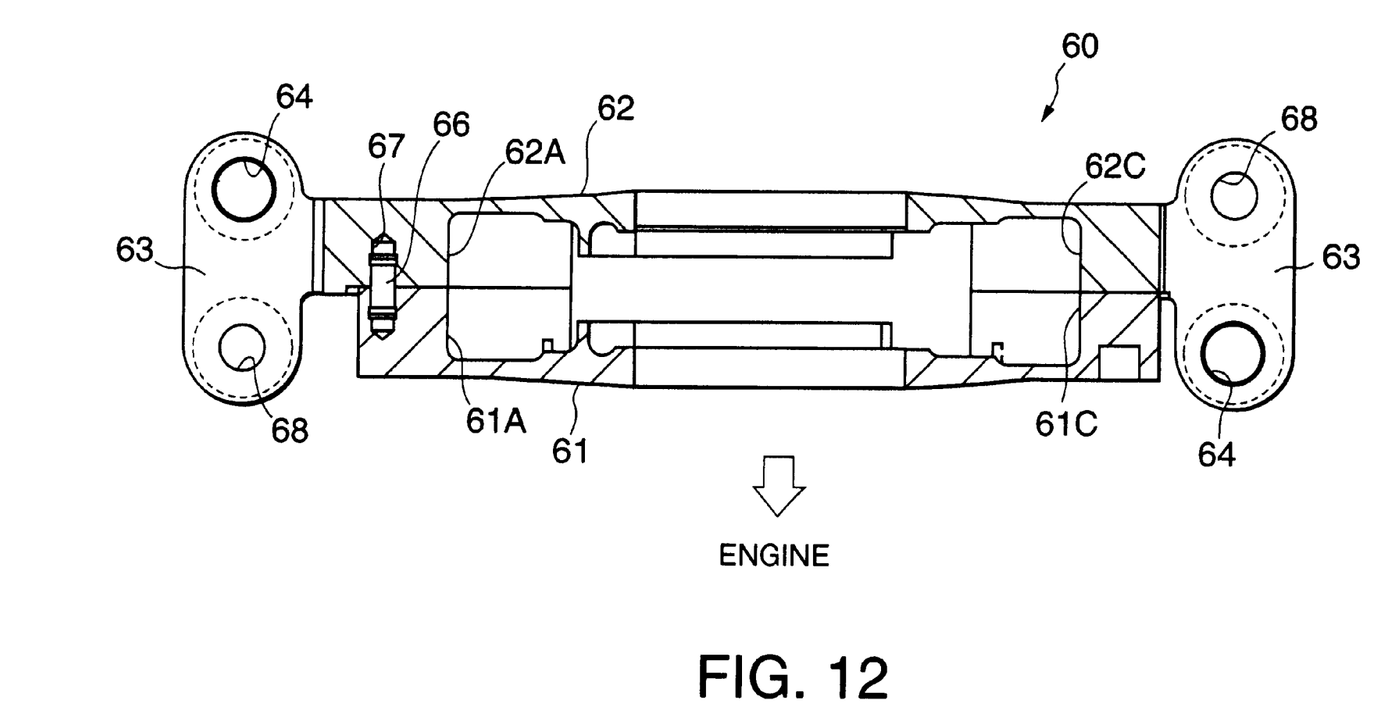
FIG. 12 is a horizontal cross-sectional view of the intermediate wall taken along a line XII—XII in FIG. 11.

Referring to FIGS. 11 and 12, the rear partition 62 and front partition 61 are mutually positioned by inserting the knock pins 66 in the pinholes 67, and a space housing the first sprocket 24 is formed by the contact parts 62A, 62B, 62C and the contact parts 61A, 61B, 61C which come into mutual contact.

An opening for inserting the chain 40 is formed between the contact parts 61B, 62B and the contact parts 61A, 62A.

A similar opening is also formed between the contact parts 61B, 62B, and the contact parts 61C, 62C for the same purpose. An opening for allowing a part of the first sprocket 24 to project outside the intermediate wall is formed between the contact parts 61A, 62A and the contact parts 61C, 62C.

Next, the structure of the casing 14 will be described.

In FIG. 6, a plane formed by the supporting surface 14D is Lw, and a plane specified by the center line $O_1$ of the shaft 1B and a center line $O_2$ of the output shaft 6 is Lc. In the infinite speed ratio transmission device according to this invention, the supporting surface 14D is formed so that the plane Lw and the plane Lc intersect at an angle close to a right-angle.

The plane Lc is approximately equivalent to the action direction of the tension of the chain 40 wound around the first sprocket 24 and second sprocket 4A.

The plane Lw which is the plane of the join between the intermediate wall 60 and the casing 14, therefore makes an angle close to a right angle to the action direction of the tension.

Positioning holes 14E and screw holes 14G are formed on the supporting surface 14D in positions corresponding to the positioning holes 64 of the projections 63. The screw holes 14G are formed in positions corresponding to the through holes 68 of the projections 63 of the supporting surface 14D. The intermediate wall 60 is fixed to the casing 14 by the bolts 80 which pass through the positioning holes 64, 14E from the opening 14L, and screw into the screw holes 14G, and the bolts 80 which pass through the through holes 68 and screw into the screw holes 14G.

Figure 13:
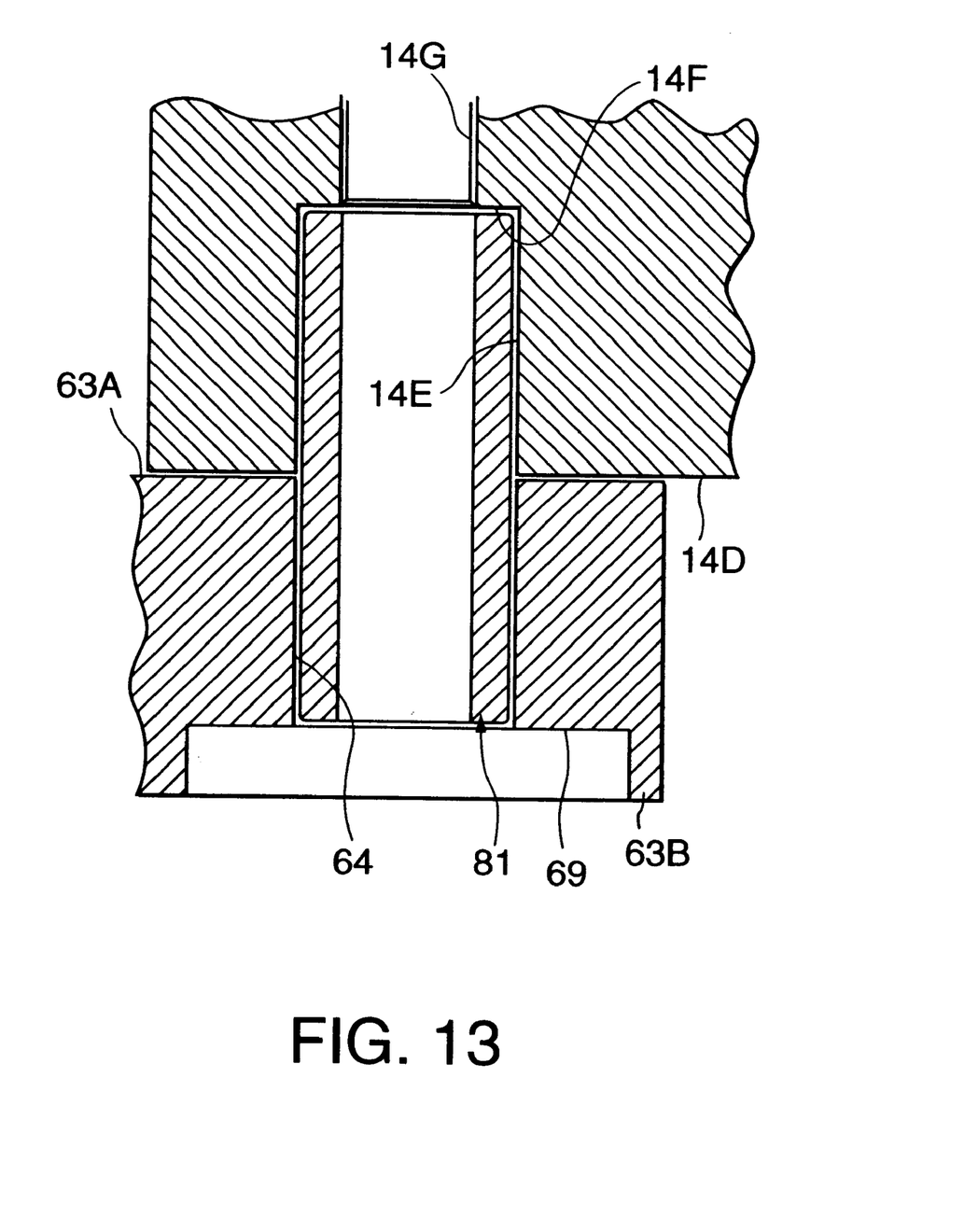
FIG. 13 is an enlarged longitudinal cross-sectional view of a supporting surface of a casing, and of a join part of a projection according to this invention.

Next, referring to FIG. 13, the structure of the positioning holes 64 will be described.

To precisely position the intermediate wall 60 relative to the center line $O_1$ of the shaft 1B, the positioning holes 14E which extend to the screw holes 14G are formed in the supporting surface 14D corresponding to the positioning holes 64. The positioning hole 14E is formed with a diameter equal to that of the positioning hole 64, and has a step 14F from the screw hole 14G which is formed in a coaxial position.

The bolt 80 is inserted in a collar 81 set in the positioning hole 64 and positioning hole 14E, and the tip part which penetrates the collar 81 screws into the screw hole 14G. The thickness of the collar 81 is equal to the height of the step 14F.

When the rear partition 62 is fixed to the casing 14, the projection 63 is brought in contact with the supporting surface 14D, and the projection 63 is first positioned relative to the supporting surface 14D by inserting the collar 81 in the positioning hole 64 and positioning hole 14E. The bolt 80 is then inserted in the collar 81 and tightened in the screw hole 14G.

By means of this process, the projection 63 can easily be fixed to the supporting surface 14D in the correct position. The collar 81 is set equal to the length from the step 14F to the recess 69.

Next, the procedure of assembling the infinite speed ratio transmission device will be described with particular reference to the installation of the CVT 2 and the output shaft 6.

Referring to FIG. 14, the support 27 of the second toroidal unit 2B which should be disposed in the rear portion of the transmission device, is fixed to the casing 14 by the bolts 29.

The first sprocket 24 and output disk 22 of the second toroidal unit 2B are then fitted to the rear partition 62 as a sub-assembly, and this sub-assembly is inserted in the casing 14 from the opening 14L.

The power circulation mode clutch 9, direct connection mode clutch 10, CVT output shaft 4 and second sprocket 4A are also fitted to the output shaft 6 as a sub-assembly. This sub-assembly is then inserted in the casing 14 from the opening 141 with the chain 40 wound around the second sprocket 4A.

When the sub-assembly reaches a predetermined position of the casing 14, the chain 40 is wound around the first sprocket 24.

The sub-assembly is inserted further into the casing 14, and when the final output shaft 6 reaches the end 14C shown in FIG. 2, the side cover 55 is fixed to the casing 14, and the end 14C is closed.

At this time, the rear partition 62 is not fixed, but is hung in the casing 14 by the chain 40 wound around the first sprocket 24.

Then, the rear partition 62 is moved along the plane Lw and its position is adjusted so that the upper surface 63A of the projection 63 of the rear partition 62 comes in contact with the supporting surface 14D of the casing 14 at a predetermined position, as shown in FIG. 6.

The positioning hole 64 of the projection 63 and the positioning hole 14E of the supporting surface 14D are made to coincide, and the collar 81 is inserted in the positioning hole 64 and positioning hole 14E. The rear partition 62 is thereby held in a predetermined position.

Next, the bolt 80 is inserted in the collar 81 and tightened in the screw hole 14G. The bolt 80 is inserted also in the through hole 68, and tightened in the screw hole 14G. This completes the fixing of the rear partition 62 on the supporting surface 14D.

Next, the front partition 61 is inserted into the space 14X, and after inserting the pin 67 in the pinhole 66, the bolt 70 is inserted in the through hole 65A and tightened in the screw hole 65, as shown in FIGS. 11 and 12. The tightening of this bolt 70 is performed from the opening 14L.

Next, the support 27 of the first toroidal unit 2A is fixed to the ceiling 17 of the casing 14, and the upper link 100 is attached to the support 27, as shown in FIG. 4. The output disk 22 of the first toroidal unit 2A is also spline jointed to the cylindrical part 24A of the first sprocket 24 from the right of FIG. 2.

The input disk 21 and loading cams 23 of the first toroidal unit 2A are also fitted to the shaft 1B as a sub-assembly, and this sub-assembly is inserted from the opening 140 of the casing 14 so that it passes through the output disks 22 and the intermediate wall 60.

The input disk 21 of the second toroidal unit 2B is fitted to the end of the shaft 1B from the end 14B of the casing 14, and the side cover 16 is fixed to the end 14B.

Next, the four trunnions 30 on which the power rollers 20 are preset, are inserted in the space 14X from the opening 14L, the upper ends of the trunnions 30 are engaged with the upper link 100, and the power rollers 20 are set between the input disk 21 and output disk 22.

The lower link 32 is fitted to the rods 30A and the hydraulic pistons 35 are fitted on the outer circumference of the rods 30A.

Finally, the differential gear 8 and the drive wheel shafts 11A, 11B are assembled, and the wall 15 is fixed to the open end 14A of the casing 14 which completes the assembly of the infinite speed ratio transmission device.

In this infinite speed ratio transmission device, as the supporting surface 14D was formed at an approximate right angle to the action direction of the tension of the chain 40, the tension of the chain 40 is directly supported by the supporting surface 14D, and the chain 40 does not exert a shear force on the bolt 80. Therefore, the size and the number of the bolts 80 which fix the intermediate wall 60 to the casing 14, can be reduced.

Moreover, when the intermediate wall 60 is fixed to the casing 14, the projections 63 of the rear partition 62 of the intermediate wall 60 are moved on the plane Lw of FIG. 6 and positioned relative to the supporting surface 14D with the chain 40 wound around the first sprocket 24, and the collar 81 is inserted in the positioning hole 64 and positioning hole 14E when this operation is finished. Therefore, positioning relative to the supporting surface 14D of the rear partition 62 can be performed without interfering with the collar 81. After this positioning, the rear partition 62 can be precisely positioned on the supporting surface 14D by inserting the collar 81 in the positioning hole 64 and positioning hole 14E.

The bolt 80 is inserted in the collar 81 and tightened in the screw hole 14G in this state, so the rear partition 62 can be quickly and precisely fixed to the casing 14. Also, the collar 81 is retained by the bolt 80 at a predetermined position, so it is unnecessary to provide a stop to prevent it falling out.

The supporting surface 14D is formed at an approximate right angle to the tension direction of the chain 40, so the positioning hole 64 and positioning hole 14E open toward the opening 14L, positioning and fixing of the rear partition 62 can both be performed manually from the opening 14L, and a large working space can be made available. Further, as the CVT 2 is also assembled from the opening 14L, the opening 140 of the end 14A of the casing 14 can be made small. Therefore, a large surface area is available for attaching an accessory such as an oil pump outside the end 14A, and by making the opening 140 small, the rigidity of the casing 14 can be increased.

Moreover, as the projections 63 are provided to the rear partition 62 forming the intermediate wall 60, the intermediate wall 60 can be fixed to the casing 14 with high accuracy by fixing the rear partition 62 to the supporting surface 14D via the projection 63.

The contents of Tokugan Hei 11-81620 with a filing date of Mar. 25, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, It is possible to provide the projections 63 to the front partition 61 instead of providing them to the rear partition 62.

Further, in the aforesaid embodiment, although the power circulation mode clutch 9 was disposed between the output gear 3B of the fixed speed ratio transmission 3 and the planet carrier 5B, the power circulation mode clutch 9 can be situated in any position between the shaft 1A and the output gear 7 of the final output shaft 6. For example, it may be disposed between the ring gear 5C and final output shaft 6, or between the shaft 1A and input gear 3A of the fixed speed ratio transmission 3. It can also be interposed midway in the CVT output shaft 4 which is joined to the sun gear 5A. In any of these cases, a desirable effect can be obtained by application of this invention.

The embodiments of this invention in which an exclusive property or privilege is claimed are defined as follows:

What is claimed is:

1. An infinite speed ratio transmission device for a vehicle, comprising:

an input shaft;

a first toroidal unit comprising a first input disk which rotates together with the input shaft, a first output disk, and two power rollers gripped between the first input disk and the first output disk;

a second toroidal unit comprising a second input disk which rotates together with the input shaft, a second output disk, and two power rollers gripped between the second input disk and the second output disk, the output disks of the two toroidal units being disposed coaxially adjacent to each other;

a first sprocket disposed between the output disks, which rotates together with the output disks;

a fixed speed ratio transmission which varies the rotation speed of the input shaft at a fixed speed ratio;

a planetary gear set comprising a sun gear joined to a second sprocket, a planet carrier which inputs the output rotation of the fixed speed ratio transmission, and a ring gear which rotates according to the relative rotation of the sun gear and the planet carrier;

a chain connecting the first sprocket and the second sprocket;

a casing housing the first toroidal unit, the second toroidal unit and the planetary gear set; and an intermediate wall supporting the first sprocket free to rotate, the intermediate wall being fixed to the casing;

wherein, the casing comprises a supporting surface which supports the intermediate wall and forms an approximate right angle to an action direction of a tension of the chain.

2. An infinite speed ratio transmission device as defined in claim 1, wherein the intermediate wall comprises a front partition and a rear partition which are divided in the direction of the input shaft, and a projection formed in one of the front partition and the rear partition, the projection being fixed to the supporting surface.

3. An infinite speed ratio transmission device as defined in claim 2, wherein the infinite speed ratio transmission device further comprises an oil pan, the casing comprises an opening facing a lateral surface of the input shaft, the opening has dimensions which permit the insertion of a sub-assembly comprising the rear partition, the first sprocket and the output disk of the second toroidal unit when the infinite speed ratio transmission device is assembled, and the opening is closed by fixing the oil pan to the casing.

4. An infinite speed ratio transmission device as defined in claim 2, wherein the infinite speed ratio transmission device further comprises a first member which positions the projection on the supporting surface, and a second member which fixes the projection on the supporting surface.

5. An infinite speed ratio transmission device as defined in claim 4, wherein a first positioning hole is formed in the projection, a second positioning hole opening onto the supporting surface and a screw hole connected to the second positioning hole are formed in the casing, the first member comprises a collar inserted in the first positioning hole and second positioning hole, and the second member comprises a bolt which passes through the collar and screws into the screw hole.

* * * * *